US012654748B2

(12) United States Patent　　(10) Patent No.: US 12,654,748 B2
Kim　　(45) Date of Patent: Jun. 16, 2026

(54) DRIVER ASSISTANCE APPARATUS AND DRIVER ASSISTANCE METHOD

(71) Applicant: HL Klemove Corp., Incheon (KR)

(72) Inventor: Inhan Kim, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 272 days.

(21) Appl. No.: 18/118,407

(22) Filed: Mar. 7, 2023

(65) Prior Publication Data

US 2023/0286547 A1　　Sep. 14, 2023

(30) Foreign Application Priority Data

Mar. 10, 2022　(KR) ........................ 10-2022-0029785

(51) Int. Cl.
| | |
|---|---|
| *G07C 5/00* | (2006.01) |
| *B60W 60/00* | (2020.01) |
| *G07C 5/02* | (2006.01) |
| *G07C 5/04* | (2006.01) |
| *G07C 5/08* | (2006.01) |

(52) U.S. Cl.
CPC ... *B60W 60/0027* (2020.02); *B60W 2420/403* (2013.01); *B60W 2552/53* (2020.02); *B60W 2554/4041* (2020.02); *B60W 2554/80* (2020.02)

(58) Field of Classification Search
CPC ....... B60W 60/0027; B60W 2420/403; B60W 2552/53; B60W 2554/4041; B60W 2554/80; B60W 60/00276; B60W 2556/40; B60W 50/0097; B60W 10/06; B60W 10/10; B60W 10/18; B60W 10/20; B60W 30/08; B60W 30/10; B60W 40/02;

B60W 2554/4023; B60W 2554/4026; B60W 2554/4029; B60R 11/04; G06T 3/18; G06T 7/73; G06T 2207/30241; H04N 7/18
See application file for complete search history.

(56) References Cited

U.S. PATENT DOCUMENTS

| | | | | |
|---|---|---|---|---|
| 10,671,076 | B1 * | 6/2020 | Kobilarov | .............. G08G 1/166 |
| 2017/0120902 | A1 * | 5/2017 | Kentley | ................ B60W 10/18 |

(Continued)

FOREIGN PATENT DOCUMENTS

| | | |
|---|---|---|
| JP | 2007-233645 A | 9/2007 |
| JP | 2020-177314 A | 10/2020 |

(Continued)

OTHER PUBLICATIONS

Office Action from Korean patent office dated Aug. 21, 2024.

*Primary Examiner* — Kito R Robinson
*Assistant Examiner* — Anthony Garbriel Mora
(74) *Attorney, Agent, or Firm* — Harvest IP Law, LLP

(57) ABSTRACT

Disclosed herein is a driver assistance apparatus including a camera installed on a vehicle, having a field of view around the vehicle, and configured to acquire image data and a controller configured to process the image data. The controller may acquire center lines of lanes connected to a lane on which the vehicle travels, identify an object positioned around the vehicle based on the processed image data, identify a plurality of trajectories along which the object is movable based on a position of the object and the center lines, select a predicted trajectory among the plurality of trajectories, and generate a target trajectory of the vehicle avoiding the predicted trajectory.

14 Claims, 7 Drawing Sheets

(56) References Cited

U.S. PATENT DOCUMENTS

| | | | | |
|---|---|---|---|---|
| 2018/0024562 A1* | 1/2018 | Bellaiche | | B60R 1/025 |
| | | | | 701/26 |
| 2019/0317511 A1* | 10/2019 | Xu | | G05D 1/0214 |
| 2020/0010083 A1* | 1/2020 | Staehlin | | B60W 50/00 |
| 2020/0211395 A1 | 7/2020 | Feist et al. | | |
| 2021/0300360 A1* | 9/2021 | Sasin | | B60W 30/18154 |
| 2022/0147041 A1* | 5/2022 | Lagnemma | | B60W 30/18163 |
| 2022/0171275 A1* | 6/2022 | Iida | | H04N 23/58 |
| 2022/0242409 A1* | 8/2022 | Park | | B60W 30/16 |
| 2022/0242485 A1* | 8/2022 | Kim | | B60Q 9/008 |
| 2022/0266824 A1* | 8/2022 | Konishi | | B60W 30/10 |
| 2022/0266840 A1* | 8/2022 | Kim | | B60W 40/114 |
| 2022/0268879 A1* | 8/2022 | Park | | G01S 7/285 |
| 2022/0289176 A1* | 9/2022 | Baek | | B60W 30/09 |
| 2022/0297727 A1* | 9/2022 | Imanishi | | B60W 50/10 |
| 2022/0340174 A1* | 10/2022 | Xia | | G08G 1/164 |
| 2023/0303115 A1* | 9/2023 | Tominaga | | G09B 29/00 |

FOREIGN PATENT DOCUMENTS

| | | |
|---|---|---|
| JP | 6822752 B2 | 1/2021 |
| KR | 10-2361501 B1 | 2/2022 |

* cited by examiner

DRIVER ASSISTANCE APPARATUS AND DRIVER ASSISTANCE METHOD

CROSS-REFERENCE TO RELATED APPLICATION

This application claims the benefit of Korean Patent Application No. 10-2022-0029785, filed on Mar. 10, 2022 in the Korean Intellectual Property Office, the disclosure of which is incorporated herein by reference.

BACKGROUND

1. Field

Embodiments of the present disclosure relate to a driver assistance apparatus, and more specifically, to a driver assistance apparatus and a driver assistance method capable of predicting a plurality of trajectories of objects positioned around a vehicle.

2. Description of the Related Art

Vehicles are the most common means of transportation in modern society, and the number of people who uses the vehicles is increasing. There are advantages such as easy long-distance transportation and comfortable living due to the development of a vehicle technology, but road traffic conditions degrade in places with high population density such as Korea, which often causes serious traffic congestion.

Recently, research on vehicles equipped with an advanced driver assist system (ADAS) for actively providing information on vehicle conditions, driver conditions, and/or surrounding environments is being actively conducted to reduce the driver's burden and enhance the driver's convenience.

As one example of the ADAS mounted on the vehicles, there is lane departure warning (LDW), lane keeping assist (LKA), high beam assist (HBA), autonomous emergency braking (AEB), traffic sign recognition (TSR), adaptive cruise control (ACC), blind spot detection (BSD), or the like.

The driver assist system may collect information on the surrounding environment and process the collected information. In addition, the driver assist system may recognize objects and design trajectories for the vehicles to travel based on results of processing the collected information.

However, the conventional driver assist system controls the movement of the vehicle depending on only one predicted trajectory related to only a selected object.

SUMMARY

Therefore, it is an aspect of the present disclosure to provide a driver assistance apparatus and a driver assistance method capable of predicting a plurality of trajectories of a plurality of objects positioned around a vehicle.

Additional aspects of the disclosure will be set forth in part in the description which follows and, in part, will be obvious from the description, or may be learned by practice of the disclosure.

In accordance with one aspect of the present disclosure, a driver assistance apparatus may include a camera installed on a vehicle, having a field of view around the vehicle, and configured to acquire image data, and a controller configured to process the image data. The controller may acquire center lines of lanes connected to a lane on which the vehicle travels, identify a position of an object positioned around the vehicle based on the processed image data, identify a plurality of trajectories along which the object is movable based on the position of the object and the center lines, select a predicted trajectory among the plurality of trajectories, and generate a target trajectory of the vehicle avoiding the predicted trajectory.

The controller may store a lane network of the lanes connected to the lane on which the vehicle travels, and acquire the center lines of the lanes based on the lane network.

The controller may select the predicted trajectory among the plurality of trajectories based on a distance between the vehicle and each of the plurality of trajectories.

The controller may select the predicted trajectory having a minimum distance from the vehicle among the plurality of trajectories.

The controller may select the predicted trajectory among the plurality of trajectories based on a time at which the vehicle and each of the plurality of trajectories cross.

The controller may select predicted trajectory along which the vehicle crosses most quickly among the plurality of trajectories.

The controller may generate a first coordinate system in which the predicted trajectory is one axis, and predict a position of the object in the first coordinate system based on the position and a speed of the object.

The controller may generate a second coordinate system in which a traveling trajectory of the vehicle is one axis, and convert the position of the object predicted in the first coordinate system into that in the second coordinate system.

The controller may generate the target trajectory of the vehicle based on the position of the object converted in the second coordinate system.

The controller may control at least one of a driving device, a braking device, and a steering device of the vehicle so that the vehicle travels along the target trajectory.

In accordance with another aspect of the present disclosure, a driver assistance method may include acquiring image data through a camera having a field of view around a vehicle, processing the image data, acquiring center lines of lanes connected to a lane on which the vehicle travels, identifying an object positioned around the vehicle based on the processed image data, identifying a plurality of trajectories along which the object is movable based on a position of the object and the center lines, selecting a predicted trajectory among the plurality of trajectories, and generating a target trajectory of the vehicle avoiding the predicted trajectory.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
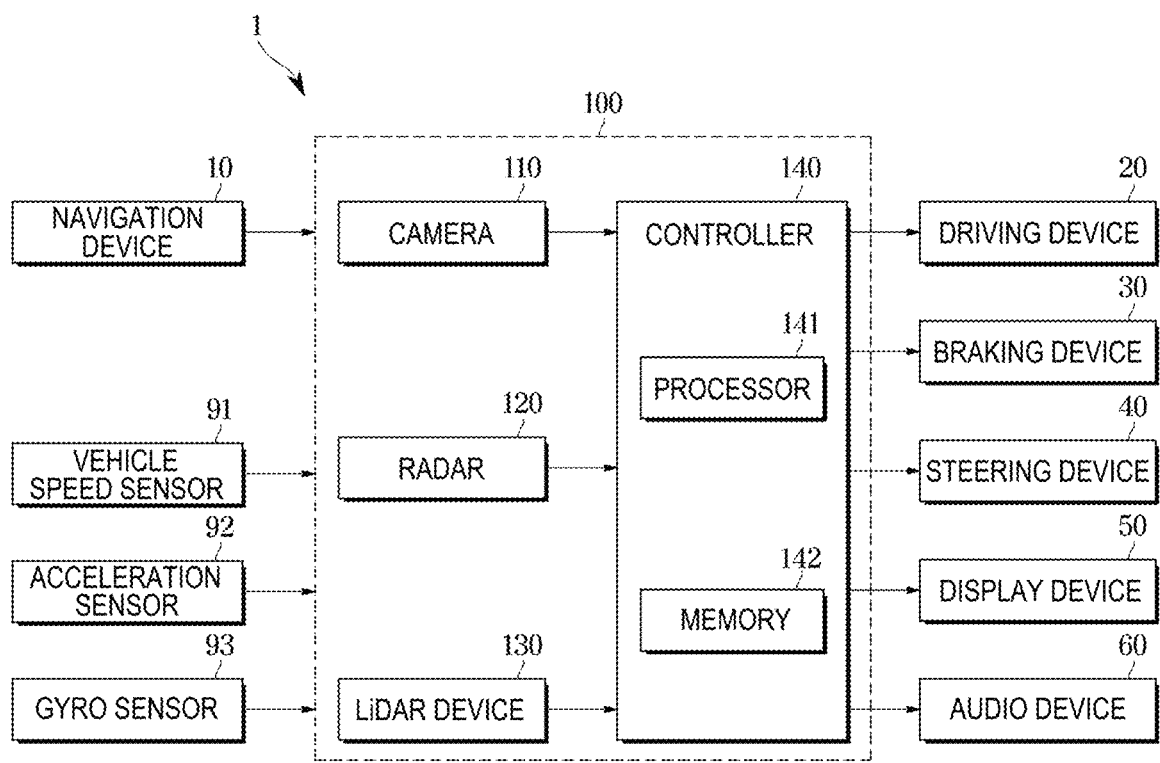
FIG. 1 shows a configuration of a vehicle and a driver assistance apparatus according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Figure 2:
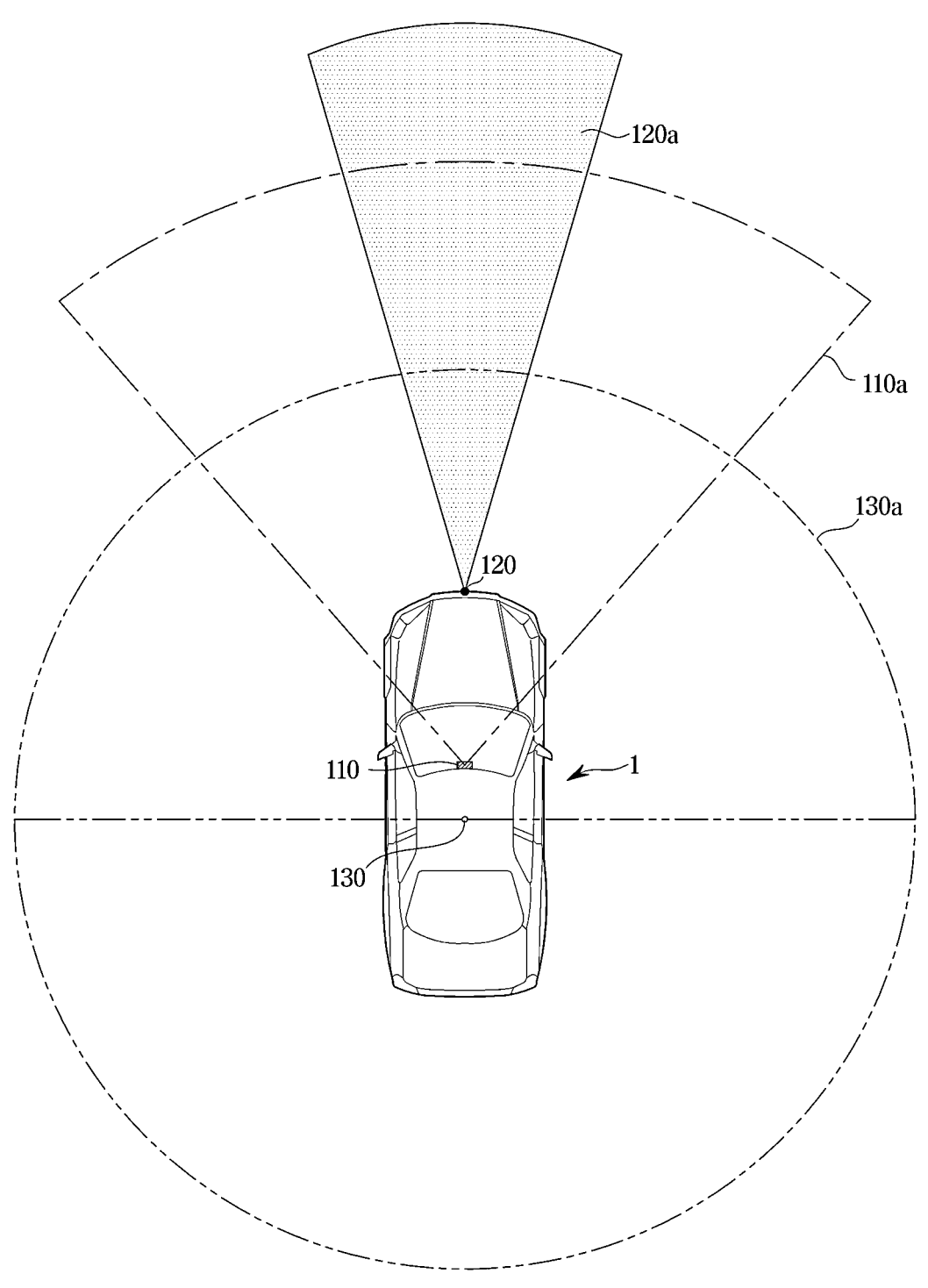
FIG. 2 shows fields of view of a camera, a radar, and a light wave detection and ranging (LiDAR) device included in the driver assistance apparatus according to one embodiment.

FIG. 1 shows a configuration of a vehicle according to one embodiment. FIG. 2 shows fields of view of a camera, a radar, and a light wave detection and ranging (LiDAR) device included in the driver assistance apparatus according to one embodiment.

As shown in FIG. 1, a vehicle 1 may include a navigation device 10, a driving device 20, a braking device 30, a steering device 40, a display device 50, an audio device 60, and/or a driver assistance apparatus 100. In addition, the vehicle 1 may further include sensors 91, 92, and 93 for detecting a dynamic of the vehicle 1. For example, the vehicle 1 may further include a vehicle speed sensor 91 for detecting a longitudinal speed of the vehicle 1, an acceleration sensor 92 for detecting a longitudinal acceleration and a lateral acceleration of the vehicle 1, and/or a gyro sensor 93 for detecting a yaw rate, a roll rate, and a pitch rate of the vehicle 1.

These may communicate with one another via a vehicle communication network NT. For example, the electrical devices 10, 20, 30, 40, 50, 60, 91, 92, 93, and 100 included in the vehicle 1 may transmit and receive data to or from each other via Ethernet, media oriented systems transport (MOST), Flexray, controller area network (CAN), local interconnect network (LIN), etc.

The navigation device 10 may generate a trajectory to a destination input by a driver and provide the generated trajectory to the driver. The navigation device 10 may receive a global navigation satellite system (GNSS) signal from a GNSS and identify an absolute position (coordinates) of the vehicle 1 based on the GNSS signal. The navigation device 10 may generate the trajectory to the destination based on the position (coordinates) of the destination input by the driver and a current position (coordinates) of the vehicle 1.

The navigation device 10 may provide map data and position information of the vehicle 1 to the driver assistance apparatus 100. In addition, the navigation device 10 may provide information on the trajectory to the destination to the driver assistance apparatus 100. For example, the navigation device 10 may provide information on a distance to an access road for the vehicle 1 to enter a new road, a distance to an exit for the vehicle 1 to exit from the road on which the vehicle 1 currently travels, or the like to the driver assistance apparatus 100.

The driving device 20 may move the vehicle 1 and include, for example, an engine, an engine management system (EMS), a transmission, and a transmission control unit (TCU). The engine may generate a power for the vehicle 1 to travel, and the EMS may control the engine in response to a driver's acceleration intention through an accelerator pedal or a request of the driver assistance apparatus 100. The transmission may decelerate and transmit the power generated by the engine to wheels, and the TCU may control the transmission in response to a driver's transmission command through a transmission lever and/or a request of the driver assistance apparatus 100.

The braking device 30 may stop the vehicle 1 and include, for example, a brake caliper and a brake control module (EBCM). The brake caliper may decelerate the vehicle 1 or stop the vehicle 1 using friction with a brake disk, and the EBCM may control the brake caliper in response to a driver's braking intention through a brake pedal and/or a request of the driver assistance apparatus 100. For example, the EBCM may receive a deceleration request including deceleration from the driver assistance apparatus 100 and control the brake caliper electrically or through a hydraulic pressure so that the vehicle 1 decelerates depending on the requested deceleration.

The steering device 40 may include an electronic power steering control module (EPS). The steering device 40 may change a traveling direction of the vehicle 1, and the EPS may assist an operation of the steering device 40 so that the driver easily operates a steering wheel in response to a driver's steering intention through the steering wheel. In addition, the EPS may control the steering device in response to a request of the driver assistance apparatus 100. For example, the EPS may receive a steering request including a steering torque from the driver assistance apparatus 100 and control the steering device to steer the vehicle 1 depending on the requested steering torque.

The display device 50 may include a cluster, a head-up display, a center fascia monitor, and the like and provide various information and entertainment to the driver using images and sounds. For example, the display device 50 may provide traveling information of the vehicle 1, a warning message, and the like to the driver.

The audio device 60 may include a plurality of speakers and provide various information and entertainment to the driver through the sounds. For example, the audio device 60 may provide the traveling information of the vehicle 1, the warning message, and the like to the driver.

The driver assistance apparatus 100 may communicate with the navigation device 10, the plurality of sensors 91, 92, and 93, the driving device 20, the braking device 30, the steering device 40, and the display device 50, and the audio device 60 through the vehicle communication network NT. The driver assistance apparatus 100 may receive information on the trajectory to the destination and position information of the vehicle 1 from the navigation device 10 and acquire information on a vehicle speed, an acceleration, and/or rates of the vehicle from the plurality of sensors 91, 92, and 93.

The driver assistance apparatus 100 may provide various functions for safety to the driver. For example, the driver assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), etc.

The driver assistance apparatus 100 may include a camera 110, a radar 120, a LiDAR device 130, and the controller 140. The driver assistance apparatus 100 is not limited to that shown in FIG. 1. For example, in the driver assistance apparatus 100 shown in FIG. 1, at least one detection means among the camera 110, radar 120, and LiDAR device 130 may be omitted or various detection means capable of detecting objects around the vehicle 1 may be added.

The camera 110, the radar 120, the LiDAR device 130, and the controller 140 may be provided separately from one another. For example, the controller 140 may be installed in a separate housing from a housing of the camera 110, a housing of the radar 120, and a housing of the LiDAR device 130. The controller 140 may transmit and receive data to and from the camera 110, the radar 120, or the LiDAR device 130 through a wide-bandwidth network.

In addition, at least some of the camera 110, the radar 120, the LiDAR device 130, and the controller 140 may be integrally provided. For example, the camera 110 and the controller 140 may be provided in one housing, the radar 120 and the controller 140 may be provided in one housing, or the LiDAR device 130 and the controller 140 may be provided in one housing.

The camera 110 may photograph surroundings of the vehicle 1 and acquire image data around the vehicle 1. For example, as shown in FIG. 2, the camera 110 may be installed on a front windshield of the vehicle 1 and may have a field of view 110a in front of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix.

The image data may include information on other vehicles, pedestrians, cyclists, or lane lines (markers distinguishing lanes) positioned around the vehicle 1.

The driver assistance apparatus 100 may include an image processor for processing the image data of the camera 110, and the image processor may be provided, for example, integrally with the camera 110 or integrally with the controller 140.

The image processor may acquire the image data from the image sensor of the camera 110 and detect and identify objects around the vehicle 1 based on the processing of the image data. For example, the image processor may generate tracks representing the objects around the vehicle 1 and classify the tracks by image processing. The image processor may identify whether the track is another vehicle, pedestrian, cyclist, or the like and assign identification codes to the tracks.

The image processor may transmit data on the tracks around the vehicle 1 (or positions and classifications of the tracks) (hereinafter referred to as "camera track") to the controller 140.

The radar 120 may transmit transmitting radio waves toward the surroundings of the vehicle 1 and detect objects around the vehicle 1 based on radio waves reflected from the surrounding objects. For example, as shown in FIG. 2, the radar 120 may be installed on a grille or a bumper of the vehicle 1 and may have a field of view 120a in front of the vehicle 1.

The radar 120 may include a transmission antenna (or a transmission antenna array) for radiating the transmitting radio waves toward the surroundings of the vehicle 1 and a reception antenna (or a reception antenna array) for receiving radio waves reflected from the objects.

The radar 120 may acquire radar data from the transmitting radio waves transmitted by the transmission antenna and the reflected radio waves received by the reception antenna. The radar data may include position information (e.g., distance information) and/or speed information of the objects positioned in front of the vehicle 1.

The driver assistance apparatus 100 may include a signal processor for processing the radar data of the radar 120, and the signal processor may be, for example, integrally provided with the radar 120 or integrally provided with the controller 140.

The signal processor may acquire radar data from the reception antenna of the radar 120 and generate the tracks representing the objects by clustering reflection points of a reflected signal. The signal processor may acquire a distance of the track on the basis of, for example, a time difference between a transmission time of the transmitting radio wave and a reception time of the reflected radio wave and acquire a relative speed of the track based on a difference between a frequency of the transmitting radio wave and a frequency of the reflected radio wave.

The signal processor may transmit data (or the distances and the relative speeds of the tracks) of the tracks around the vehicle 1 acquired from the radar data (hereinafter referred to as "radar track") to the controller 140.

The LiDAR device 130 may emit light (e.g., infrared rays) toward the surroundings of the vehicle 1 and detect objects around the vehicle 1 based on reflected light reflected from the surrounding objects. For example, as shown in FIG. 2, the LiDAR device 130 may be installed on a roof of the vehicle 1 and may have fields of view 130a in all directions around the vehicle 1.

The LiDAR device 130 may include a light source (e.g., a light emitting diode, a light emitting diode array, a laser diode, a laser diode array) for emitting light (e.g., infrared rays) and an optical sensor (e.g., a photodiode or a photodiode array) for receiving light (e.g., infrared rays). In addition, as necessary, the LiDAR device 130 may further include a driving device for rotating the light source and/or the optical sensor.

While the light source and/or the optical sensor rotate, the LiDAR device 130 may emit light through the light source and receive light reflected from the objects through the optical sensor, and thus acquire LiDAR data.

The LiDAR data may include relative positions (distances of the surrounding objects and/or directions of the surrounding objects) and/or relative speeds of the surrounding objects of the vehicle 1.

The driver assistance apparatus 100 may include the signal processor capable of processing LiDAR data of the LiDAR device 130, and the signal processor may be, for example, provided integrally with the LiDAR device 130 or provided integrally with the controller 140.

The signal processor may generate tracks representing objects by clustering reflection points by the reflected light. The signal processor may acquire a distance to the object on the basis of, for example, a time difference between a light transmission time and a light reception time. In addition, the signal processor may acquire a direction (or an angle) of the object with respect to the traveling direction of the vehicle 1 based on a direction in which the light source emits light when the optical sensor receives the reflected light.

The signal processor may transmit data (or distances and relative speeds of the tracks) of the tracks around the vehicle 1 acquired from LiDAR data (hereinafter referred to as "LiDAR track") to the controller 140.

The controller 140 may be electrically connected to the camera 110, the radar 120, and/or the LiDAR device 130. In addition, the controller 140 may control the navigation device 10, the driving device 20, the braking device 30, the steering device 40, the display device 50, and the audio device 60, and/or the plurality of sensors 91, 92, and 93 through the vehicle communication network NT.

The controller 140 may process the camera track (or the image data) of the camera 110, the radar track (or the radar data) of the radar 120, and/or the LiDAR track (or the LiDAR data) of the LiDAR device 130 and provide control signals to the driving device 20, the braking device 30, and/or the steering device 40.

The controller 140 may include a processor 141 and a memory 142.

The memory 142 may store programs and/or data for processing the image data, the radar data, and/or the LiDAR data. In addition, the memory 142 may store programs and/or data for generating driving/braking/steering signals.

The memory 142 may temporarily store the image data received from the camera 110, the radar data received from the radar 120, and/or the LiDAR data received from the LiDAR device 130 and temporarily store a processing result of the image data, the radar data, and/or the LiDAR data of the processor 141.

In addition, the memory 142 may include a high definition map (HD Map). Unlike general maps, the HD map may include detailed information on surfaces of roads or intersections, such as lane lines, traffic lights, intersections, and road signs. In particular, in the HD map, landmarks (e.g., lane lines, traffic lights, intersections, and road signs) that a vehicle encounters while traveling are implemented in a three dimension.

The memory 142 may include not only a volatile memory such as a static random access memory (SRAM) or a dynamic random access memory (DRAM), but also a nonvolatile memory such as a flash memory, a read only memory (ROM), or an erasable programmable read only memory (EPROM).

The processor 141 may process the camera track of the camera 110, the radar track of the radar 120, and/or the LiDAR track of the LiDAR device 130. For example, the processor 141 may fuse the camera track, the radar track, and/or the LiDAR track and output fusion tracks.

The processor 141 may generate the driving signal, the braking signal, and/or the steering signal for controlling the driving device 20, the braking device 30, and/or the steering device 40, respectively, based on the processed fusion tracks. For example, the processor 141 may evaluate a risk of collision between the fusion tracks and the vehicle 1. The processor 141 may control the driving device 20, the braking device 30, and/or the steering device 40 to steer or brake the vehicle 1 based on the risk of collision between the fusion tracks and the vehicle 1.

The processor 141 may include the image processor for processing the image data of the camera 110, the signal processor for processing the radar data of the radar 120 and/or the LiDAR data of the LiDAR device 130, or a micro control unit (MCU) for generating the driving/braking/steering signals.

As described above, the controller 140 may provide the driving signal, the braking signal, or the steering signal based on the image data of the camera 110, the radar data of the radar 120, or the LiDAR data of the LiDAR device 130.

A specific operation of the driver assistance apparatus 100 will be described in more detail below.

Figure 3:
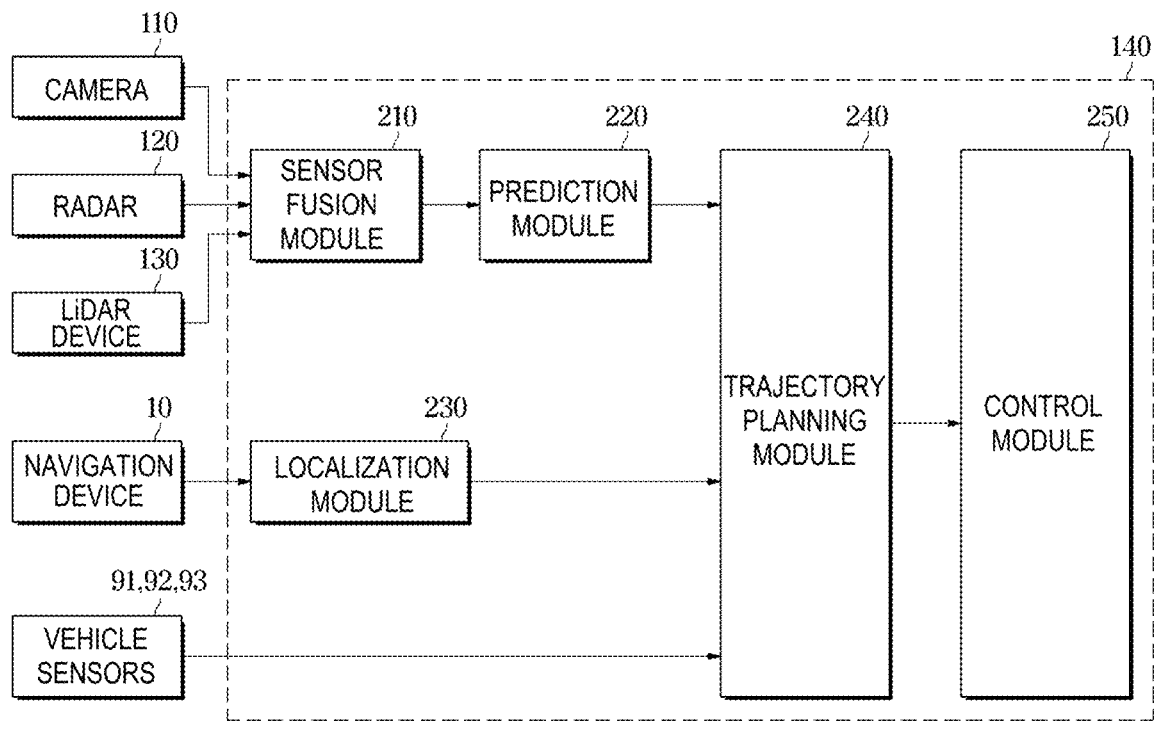
FIG. 3 shows functional modules of a controller included in the driver assistance apparatus according to one embodiment.
Figure 4:
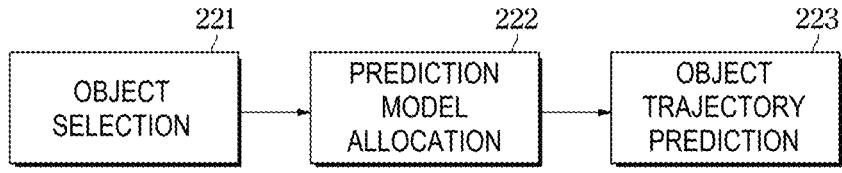
FIG. 4 is a detailed view of a prediction module shown in FIG. 3.
Figure 5:
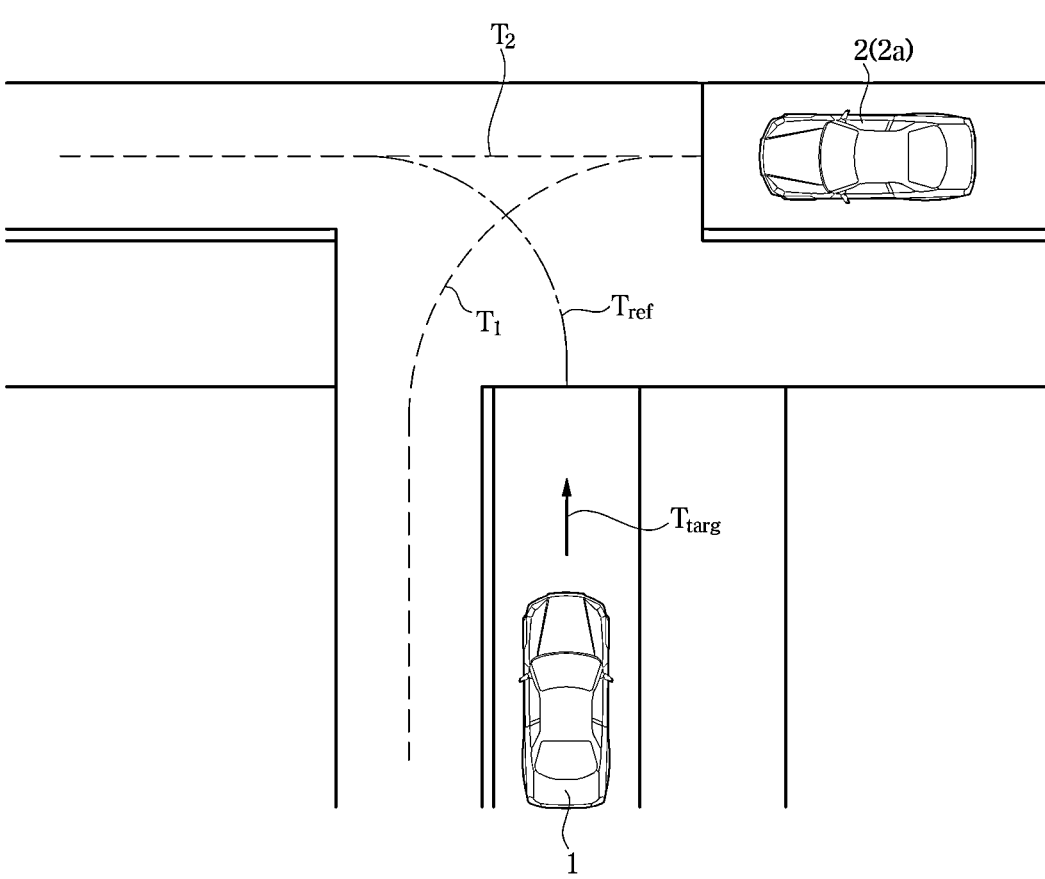
FIG. 5 shows one example of a plurality of predictable trajectories of another vehicle and a trajectory of a vehicle corresponding thereto.
Figure 6:
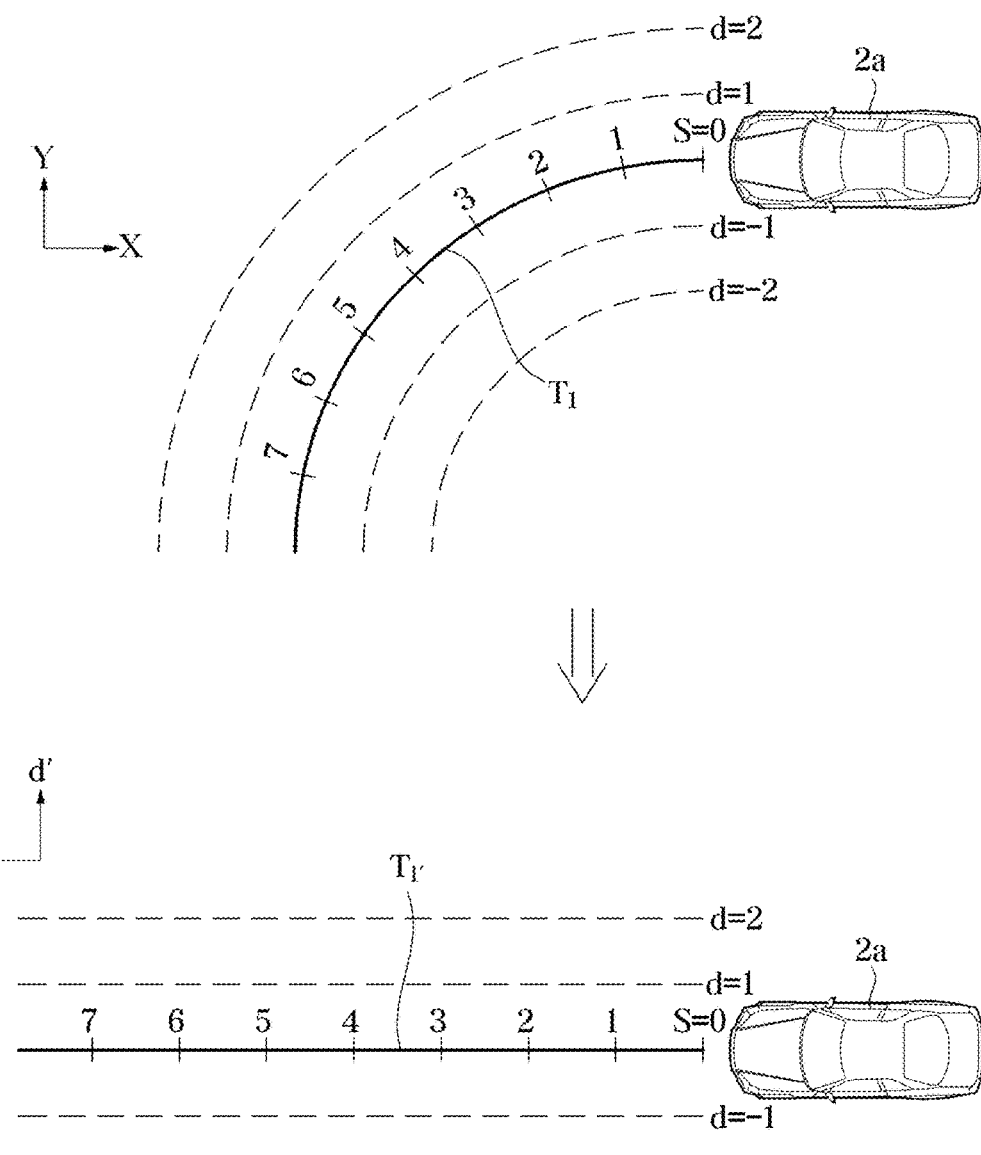
FIG. 6 shows converting a coordinate system based on a predicted trajectory of another vehicle.
Figure 7:
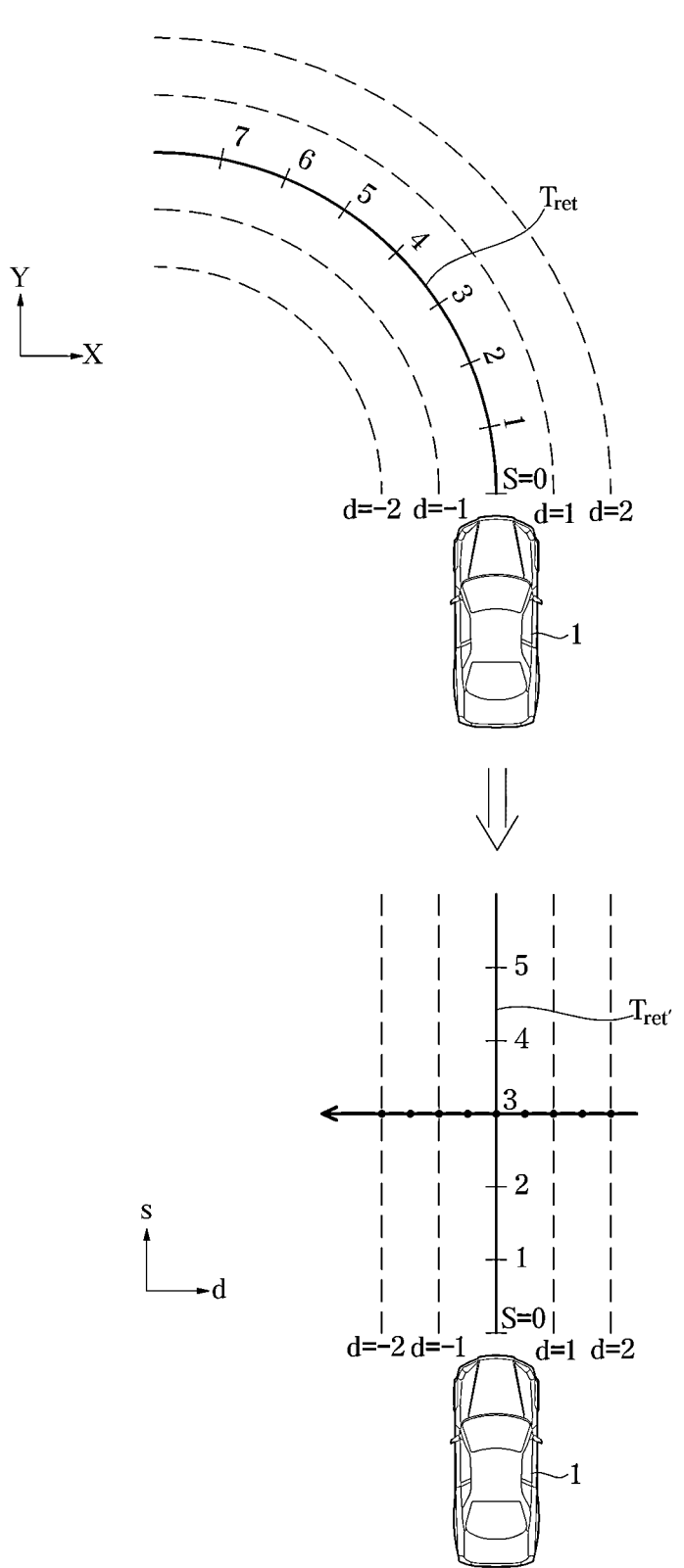
FIG. 7 shows converting a coordinate system based on a trajectory of the vehicle itself.
Figure 8:
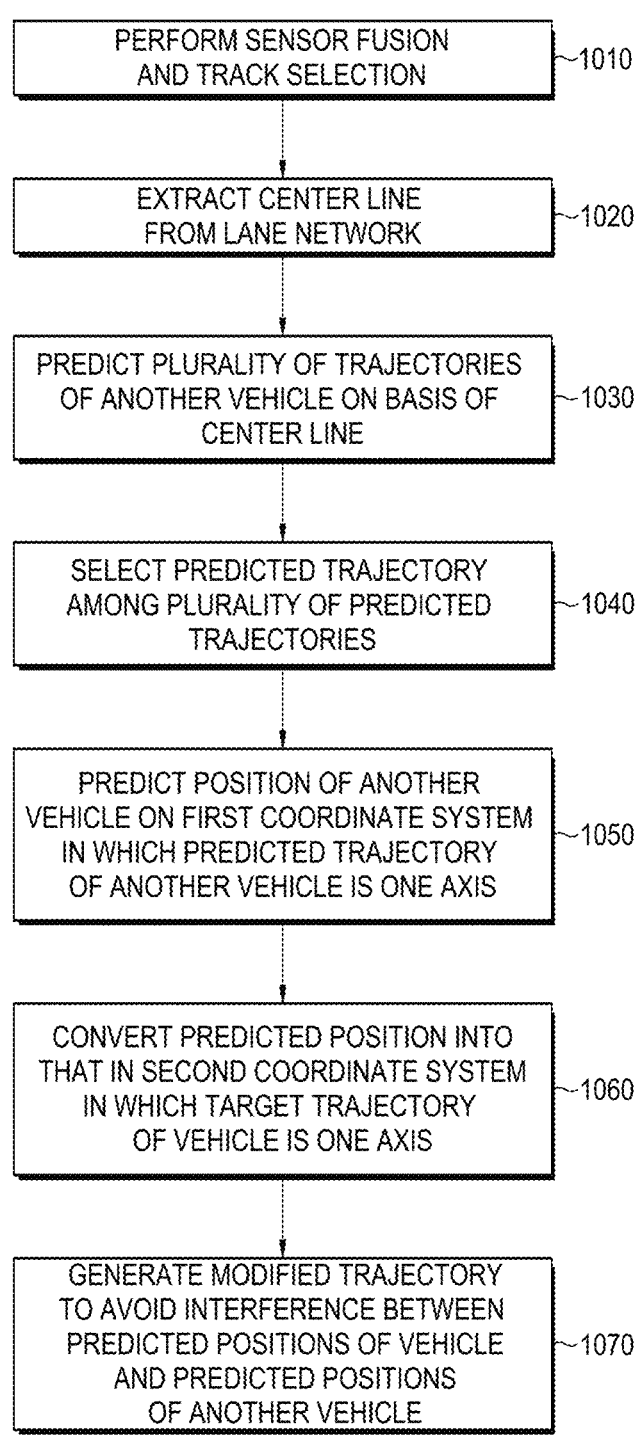
FIG. 8 shows an operation of the driver assistance apparatus according to one embodiment.

FIG. 3 shows functional modules of a controller included in the driver assistance apparatus according to one embodiment. FIG. 4 is a detailed view of a prediction module shown in FIG. 3. FIG. 5 shows one example of a plurality of predictable trajectories of another vehicle and a trajectory of a vehicle corresponding thereto. FIG. 6 shows converting a coordinate system based on a predicted trajectory of another vehicle. FIG. 7 shows converting a coordinate system based on a trajectory of the vehicle itself. FIG. 8 shows an operation of the driver assistance apparatus according to one embodiment.

The controller 140 may functionally include a plurality of modules. Each of the modules may be a hardware module (e.g., an application specific integrated circuit (ASIC) or a field programmable gate array (FPGA)) included in the processor 141 or a software module (e.g., an application program or data) stored in the memory 142.

As shown in FIG. 3, the controller 140 may include a sensor fusion module 210, a prediction module 220, a localization module 230, a trajectory planning module 240, and a control module 250.

The sensor fusion module 210 of the controller 140 may fuse the camera track of the camera 110, the radar track of the radar 120, and the LiDAR track of the LiDAR device 130 and output tracks corresponding to objects around the vehicle 1.

The sensor fusion module 210 may identify a relative position (angle with respect to the traveling direction) and/or classification (e.g., whether the object is another vehicle, pedestrian, cyclist, or the like) of the camera track. The sensor fusion module 210 may identify a relative position (distance from the vehicle) and/or a relative speed of the radar track. In addition, the sensor fusion module 210 may identify a relative position (distance from the vehicle and/or angle to the traveling direction) and/or a relative speed of the LiDAR track.

The sensor fusion module 210 may match the camera track, the radar track, and the LiDAR track and acquire the fusion track based on matching the tracks. For example, the sensor fusion module 210 may identify overlapping fusion tracks among the camera track, the radar tracks, and the LiDAR track based on position information of the camera track, position information of the radar track, and position information of the LiDAR track.

In addition, the sensor fusion module 210 may integrate information on the camera track, information on the radar track, and/or information on the LiDAR track. The sensor fusion module 210 may integrate information (e.g., position information and speed information) of the fusion track acquired from the camera 110, information (e.g., position information and speed information) of the fusion track acquired from the radar 120, information (e.g., position information and speed information) of the fusion track acquired from the LiDAR device 130.

The sensor fusion module 210 may provide the fusion tracks and the information on the fusion tracks (e.g., the information on classification, positions, and speeds) to the prediction module 220.

The prediction module 220 of the controller 140 may receive the information on the fusion tracks from the sensor fusion module 210 and predict trajectories of the tracks.

As shown in FIG. 4, the prediction module 220 may perform object selection 221, prediction model allocation 222, and/or object trajectory prediction 223 for each of the plurality of tracks.

The object selection 221 may include selecting tracks related to the traveling of the vehicle 1 among the plurality of fusion tracks. For example, in the object selection 221, the controller 140 may select a fusion track moving along a traveling trajectory of the vehicle 1 among the plurality of fusion tracks.

The prediction model allocation 222 may include allocating a prediction model to the selected fusion track based on the classification of the selected fusion track. For example, the controller 140 may allocate a vehicle model to predict the trajectory of the fusion track based on the fact that the selected fusion track is a fusion track of a vehicle and allocate a pedestrian model to predict the trajectory of the fusion track based on the fact that the selected fusion track is a fusion track of a pedestrian.

The object trajectory prediction 223 may include predicting a plurality of trajectories of the fusion track using the allocated prediction model. For example, the object trajectory prediction 223 may include predicting the plurality of trajectories of the fusion track using a lane network based on the fact that the fusion track is a fusion track of a vehicle.

For example, as shown in FIG. 5, the vehicle 1 may enter an intersection to make a left turn. The camera 110, the radar 120, and/or the LiDAR device 130 may detect another vehicle 2 entering the intersection and output a track corresponding to another vehicle 2.

The sensor fusion module 210 may fuse the camera track, the radar track, and/or the LiDAR track and output a fusion track 2a corresponding to another vehicle 2. In the object selection 221, the fusion track 2a corresponding to another vehicle 2 may be selected as a target, and in the prediction model allocation 222, the vehicle model may be allocated to the fusion track 2a.

In the object trajectory prediction 223, the prediction module 220 may predict a trajectory of the fusion track 2a based on a center line of a lane. In particular, the prediction module 220 may predict a plurality of trajectories of the fusion track 2a using the lane network. For example, a first trajectory T1 in which the fusion track 2a makes a left turn at the intersection and a second trajectory T2 in which the fusion track 2a goes straight at the intersection may be predicted based on the lane network.

The prediction module 220 may evaluate a risk of collision with the vehicle 1 for each of the plurality of predicted trajectories. For example, the prediction module 220 may evaluate the risk of collision with the vehicle 1 based on whether each of the plurality of trajectories crosses the traveling trajectory of the vehicle 1 or evaluate the risk of collision with the vehicle 1 based on a distance between each of the plurality of trajectories and the vehicle 1.

In the object trajectory prediction 223, the prediction module 220 may select a predicted trajectory having the highest risk of collision with the vehicle 1 among the plurality of predicted trajectories. For example, the prediction module 220 may select a predicted trajectory that crosses the traveling trajectory of the vehicle 1 and is closest to the vehicle 1 among the plurality of predicted trajectories. As another example, the prediction module 220 may select a predicted trajectory that first crosses the traveling trajectory of the vehicle 1 among the plurality of predicted trajectories.

The prediction module 220 may select the first trajectory T1 closer to the vehicle 1 among the first trajectory T1 and the second trajectory T2 shown in FIG. 5 as the predicted trajectory.

The prediction module 220 may output the predicted trajectory selected in the object trajectory prediction 223.

The localization module 230 of the controller 140 may acquire the map data and the position information of the vehicle 1 from the navigation device 10. The localization module 230 may identify the position of the vehicle 1 based on the map data and the position information of the vehicle 1. In other words, the controller 140 may identify absolute coordinates of the vehicle 1. The localization module 230 may provide the map data and the position information of the vehicle 1 to the trajectory planning module 240.

The trajectory planning module 240 of the controller 140 may acquire positions of objects and the predicted trajectories from the prediction module 220 and acquire the map data and the position of the vehicle 1 from the localization module 230.

The trajectory planning module 240 may calculate acceleration or deceleration for accelerating or decelerating the vehicle 1 based on the predicted trajectory output from the prediction module 220.

The trajectory planning module 240 may project the vehicle 1 and/or the objects on the map data based on the positions of the objects and the position of the vehicle 1. For example, the trajectory planning module 240 may project the vehicle 1 on the map data based on the position information of the vehicle 1 and project the objects around the vehicle 1 on the map data based on relative positions and the predicted trajectories of the objects.

The trajectory planning module 240 may acquire information on the dynamic of the vehicle 1 such as the vehicle speed, the acceleration, and/or the rates from the plurality of sensors 91, 92, and 93. The trajectory planning module 240 may predict the trajectory of the vehicle 1 based on the vehicle speed, the acceleration, and/or the rates of the vehicle 1.

In addition, the trajectory planning module 240 may identify whether there is a collision between the vehicle 1 and the objects based on the predicted trajectories of the objects and generate the trajectory of the vehicle 1 for avoiding the collision with the objects.

The trajectory planning module 240 may use a Frenet coordinate system to quickly and accurately calculate the acceleration or deceleration.

The Frenet coordinate system may use a curve on a Cartesian coordinate system using an X-axis coordinate and a Y-axis coordinate as a reference axis. For example, as shown in FIG. 6, the first trajectory T1 in which the fusion track 2a makes the left turn at the intersection may be a curve. The trajectory planning module 240 may generate a first Frenet coordinate system having the first trajectory T1 as one axis. Specifically, the trajectory planning module 240 may generate a first conversion matrix for converting vectors and coordinates of the Cartesian coordinate system into those in the first Frenet coordinate system. The trajectory planning module 240 may convert the position and speed of the fusion track 2a identified in the Cartesian coordinate system into a position and a speed in the first Frenet coordinate system using the first conversion matrix and predict positions of the fusion track 2a over time in the first Frenet coordinate system.

In addition, as shown in FIG. 7, the trajectory planning module 240 may generate a second Frenet coordinate system having a target trajectory of the vehicle 1 as one axis. In other words, the trajectory planning module 240 may generate a second conversion matrix for converting vectors and coordinates of the Cartesian coordinate system into those in the second Frenet coordinate system.

The trajectory planning module 240 may predict positions of the vehicle 1 over time in the second Frenet coordinate system based on the position and speed of the vehicle 1. Specifically, the trajectory planning module 240 may predict the positions of the vehicle 1 over time in the second Frenet coordinate system based on the position and speed of the vehicle 1 using the second conversion matrix.

The trajectory planning module 240 may convert the predicted positions of the fusion track 2a in the first Frenet coordinate system into those in the second Frenet coordinate system using the first conversion matrix and the second conversion matrix. The trajectory planning module 240 may generate or modify the trajectory of the vehicle 1 for avoiding the collision between the vehicle 1 and another vehicle 2 in the second Frenet coordinate system.

The trajectory planning module 240 may control a traveling speed of the vehicle 1 within the trajectory to the destination. For example, as shown in FIG. 5, the trajectory planning module 240 may generate and output a target trajectory T_targ for avoiding the collision between the vehicle 1 and another vehicle 2 within a reference trajectory T_ref to the destination. The target trajectory T_targ may include decelerating or stopping the vehicle 1 before the vehicle 1 enters the intersection in order to avoid the collision with another vehicle 2.

The trajectory planning module 240 may output the target trajectory T_targ.

The control module 250 of the controller 140 may include driving control for controlling the driving device 20, braking control for controlling the braking device 30, and steering control for controlling the steering device 40.

The control module 250 may output the driving signal, the braking signal, or the steering signal to follow the target trajectory. For example, as shown in FIG. 5, the control module 250 may provide the braking signal to the braking device 30 to decelerate the vehicle 1 to follow the target trajectory T_targ.

As described above, the driver assistance apparatus 100 may acquire the information on the surrounding objects and predict the plurality of trajectories of the surrounding object.

The driver assistance apparatus 100 may compare the plurality of predicted trajectories of the surrounding object on the Frenet coordinate system and the predicted (or generated) trajectory of the vehicle 1 and identify whether the predicted (or generated) trajectory of the vehicle 1 interferes with the plurality of predicted trajectories of the surrounding object. The driver assistance apparatus 100 may modify the trajectory of the vehicle 1 based on the fact that the predicted (or generated) trajectory of the vehicle 1 interferes with at least one of the plurality of predicted trajectories of the surrounding object.

FIG. 8 shows an operation of the driver assistance apparatus according to one embodiment.

Referring to FIG. 8, the driver assistance apparatus 100 performs sensor fusion and track selection (1010).

The controller 140 may fuse the image data of the camera 110, the radar data of the radar 120, and the LiDAR data of the LiDAR device 130 and detect the objects around the vehicle 1. The controller 140 may match the camera track, the radar track, and the LiDAR track and acquire the fusion track based on a result of the matching.

The controller 140 may select a track related to the traveling of the vehicle 1 among the plurality of fusion tracks. For example, the controller 140 may select a track positioned at the intersection at which the vehicle 1 enters among the plurality of fusion tracks.

The driver assistance apparatus 100 may extract the center line of the lane on the lane network (1020).

The controller 140 may acquire the lane network of the lanes related to the lane on which the vehicle 1 currently travels from the HD map stored in the memory 142 and extract the center line of the lane from the lane network. Therefore, the controller 140 may acquire the plurality of travelable trajectories through which another vehicle traveling around the vehicle 1 may travel.

The driver assistance apparatus 100 may predict the plurality of trajectories of another vehicle based on the center line (1030).

The controller 140 may acquire the track, the position of the track, and/or the speed of the track corresponding to the object around the vehicle 1 based on the image data, the radar data, and/or the LiDAR data.

The controller 140 may identify a center line of the lane on which the surrounding object is positioned based on the position of the track and predict the plurality of trajectories of the surrounding object based on the plurality of center lines connected to the identified center line.

The driver assistance apparatus 100 may select the predicted trajectory among the plurality of trajectories (1040).

The controller 140 may select one of the plurality of trajectories as the predicted trajectory based on the distance between the position of the vehicle 1 and the plurality of trajectories. For example, the controller 140 may select a trajectory closest to the vehicle 1 as the predicted trajectory.

The controller 140 may select one of the plurality of trajectories as the predicted trajectory based on the time at which the vehicle 1 crosses. For example, the controller 140 may select the trajectory along which the vehicle 1 crosses most quickly as the predicted trajectory.

The driver assistance apparatus 100 may predict the position of another vehicle on the first coordinate system having the predicted trajectory of another vehicle as one axis (1050).

The controller 140 may generate the first Frenet coordinate system in which the predicted trajectory of another vehicle is one axis. The controller 140 may convert the position and speed of another vehicle into the position and speed in the first Frenet coordinate system and predict the positions of another vehicle over time in the first Frenet coordinate system.

The driver assistance apparatus 100 may convert the predicted positions of another vehicle into those in the second coordinate system in which the target trajectory of the vehicle 1 is one axis (1060).

The controller 140 may generate the second Frenet coordinate system in which the target trajectory of the vehicle 1 is one axis. The controller 140 may predict the positions of the vehicle 1 over time in the second Frenet coordinate system based on the position and speed of the vehicle 1. The controller 140 may convert the predicted positions of another vehicle in the first Frenet coordinate system into those in the second Frenet coordinate system.

The driver assistance apparatus 100 may generate the modified trajectory to avoid the interference between the predicted positions of the vehicle 1 and the predicted positions of another vehicle (1070).

The controller 140 may generate or modify the trajectory of the vehicle 1 for avoiding the collision between the vehicle 1 and another vehicle 2 in the second Frenet coordinate system.

As is apparent from the above description, it is possible to provide a driver assistance apparatus and a driver assistance method capable of predicting a plurality of trajectories of a plurality of objects positioned around a vehicle.

Therefore, the driver assistance apparatus can predict and avoid various dangerous situations caused by various trajectories along which a target may travel.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driver assistance apparatus comprising:
a controller configured to process electrical signal acquired from a camera installed on a vehicle,
wherein the controller is configured to:
acquire center lines of lanes related to a lane on which the vehicle currently travels based on a lane network of a high definition (HD) map, including, an intersection where the lane on which the vehicle currently travels meets another road;
identify a position of an object positioned around the vehicle based on the processed electrical signal;
identify a plurality of trajectories, each generated substantially along a corresponding one of the center lines of the lanes based on the position of the object, along which the object is movable;
select a traveling trajectory of the vehicle based on the processed electrical signal;
select a predicted trajectory among the plurality of trajectories, based on the predicted trajectory being first to intersect the traveling trajectory, and identify the predicted trajectory as having the highest collision risk with the vehicle;
generate a first coordinate system in which the predicted trajectory is one axis;
predict a position of the object in the first coordinate system based on the position and a speed of the object;
generate a second coordinate system in which the traveling trajectory of the vehicle is one axis;
convert the position of the object predicted in the first coordinate system into that in the second coordinate system;
and generate a target trajectory of the vehicle avoiding the predicted trajectory based on the converted position.

2. The driver assistance apparatus of claim 1, wherein the controller is configured to:
store the lane network of the lanes related to the lane on which the vehicle currently travels.

3. The driver assistance apparatus of claim 1, wherein the controller selects the predicted trajectory among the plurality of trajectories based on a distance between the vehicle and each of the plurality of trajectories.

4. The driver assistance apparatus of claim 3, wherein the controller selects the predicted trajectory having a minimum distance from the vehicle among the plurality of trajectories.

5. The driver assistance apparatus of claim 1, wherein the controller selects the predicted trajectory among the plurality of trajectories based on a time at which the vehicle and each of the plurality of trajectories cross.

6. The driver assistance apparatus of claim 1, wherein the controller generates the target trajectory of the vehicle based on the position of the object converted in the second coordinate system.

7. The driver assistance apparatus of claim 1, wherein the controller controls at least one of a driving device, a braking device, and a steering device of the vehicle so that the vehicle travels along the target trajectory.

8. A driver assistance method comprising:

Processing electrical signal acquired from a camera installed on a vehicle;

Acquiring center lines of lanes related to a lane on which the vehicle currently travels based on a lane network of a high definition (DH) map, including, an intersection where the lane on which the vehicle currently travels meets another road;

Identifying a position of an object positioned around the vehicle based on the processed electrical signal;

Identifying a plurality of trajectories, each generated substantially along a corresponding one of the center lines of the lanes based on the position of the object, along which the object is moveable;

Selecting a traveling trajectory of the vehicle based on the processed electrical signal;

Selecting a predicted trajectory among the plurality of trajectories, based on the predicted trajectory being first to intersect the traveling trajectory, and identifying the predicted trajectory as having the highest collision risk with the vehicle;

Generating a first coordinate system in which the predicted trajectory is one axis;

Predicting a position of the object in the first coordinate system based on the position and a speed of the object;

Generating a second coordinate system in which the traveling trajectory of the vehicle is one axis;

Converting the position of the object prediction in the first coordinate system into that in the second coordinate system;

And generating a target trajectory of the vehicle avoiding the predicted trajectory based on the converted position.

9. The driver assistance method of claim 8, wherein the acquiring of the center lines of the lanes comprises: storing the lane network of the lanes related to the lane on which the vehicle currently travels.

10. The driver assistance method of claim 8, wherein the selecting of the predicted trajectory comprises selecting the predicted trajectory among the plurality of trajectories based on a distance between the vehicle and each of the plurality of trajectories.

11. The driver assistance method of claim 10, wherein the selecting of the predicted trajectory comprises selecting the predicted trajectory having a minimum distance from the vehicle among the plurality of trajectories.

12. The driver assistance method of claim 8, wherein the selecting of the predicted trajectory comprises selecting the predicted trajectory among the plurality of trajectories based on a time at which the vehicle and each of the plurality of trajectories cross.

13. The driver assistance method of claim 8, wherein the generating of the target trajectory of the vehicle further comprises generating a target trajectory of the vehicle based on the position of the object converted in the second coordinate system.

14. The driver assistance method of claim 8, further comprising controlling at least one of a driving device, a braking device, and a steering device of the vehicle so that the vehicle travels along the target trajectory.

* * * * *